United States Patent [19]

Van Assendelft et al.

[11] 3,892,664

[45] July 1, 1975

[54] BLOOD DIALYZER OF THE COIL TYPE

[75] Inventors: Leendert Van Assendelft, Arnhem; Jacob M. Van Der Kloot, Lunteren; Antonie Van 'T Sant; Hendrikus J. Speklé, both of Arnhem, all of Netherlands

[73] Assignee: Organon Teknika B.V., Industrielaan, Netherlands

[22] Filed: July 26, 1973

[21] Appl. No.: 382,858

[30] Foreign Application Priority Data

July 26, 1972 Netherlands...................... 7210262

[52] U.S. Cl................................ 210/321; 210/494
[51] Int. Cl.............................................. B01d 31/00
[58] Field of Search............. 210/22, 321, 456, 494

[56] References Cited
UNITED STATES PATENTS 3,412,865  11/1968  Luntz et al........................ 210/321
3,508,662  4/1970  Miller............................... 210/321
3,741,395  6/1973  Zimmerman...................... 210/321

Primary Examiner—Frank A. Spear, Jr.
Attorney, Agent, or Firm—Stevens, Davis, Miller and Mosher

[57] ABSTRACT

A blood dialyzer having a housing enclosing a cylindrical core with at least one opening therein, a tubular dialysis membrane wound about the core and tubes connected to the membrane for flow of blood therethrough is provided with a recess in the core wall adjacent to the opening to receive the pleated end of the membrane attached to the tube to reduce resistance to blood flow.

15 Claims, 4 Drawing Figures

BLOOD DIALYZER OF THE COIL TYPE

This invention relates to a blood dialyzer having a core provided with at least one opening in the cylindrical rigid wall thereabout, a dialysis space surrounding the core wall, in which space at least one tubular dialysis membrane and a supporting screen are wound on the wall, a first tube located inside the core, a first connection outside said dialysis space and supported in the core opening which connection connects the first tube to the dialysis membrane, the connection comprising a hollow plug connected to the first tube, on which plug the inside open end of the dialysis membrane is secured liquid tight by attaching means, and a second tube which is connected to the outside end of the dialysis membrane with the aid of a second connection.

With a known blood dialyzer of this type, which is used as an artificial kidney, the inside end of the dialysis membrane contains a round, hollow connecting plug. In this plug there is secured a blood tube for the transport of blood to the dialysis membrane. The end of the membrane is clamped on the connecting plug by means of a rubber O-ring for which an annular groove is provided in the plug. On the plug and the end of the membrane there is placed a tightly fitting sleeve.

A blood dialyzer of this type is known from U.S. Pat. No. 3,508,662.

The so formed connection of the dialysis membrane to the blood inlet tube is supported in an opening provided in the core. The dialysis membrane and a supporting gauze are coiled on the core wall in such a way that between every two successive windings of the dialysis membrane there is a layer of supporting gauze. The first gauze winding rests on the core wall. This winding is provided with an opening to allow for the passage of the connection of the dialysis membrane to the blood inlet tube.

With this known artificial kidney there is the problem formed by the abrupt bending of the dialysis membrane at its transition to the periphery of the core from the point where it is connected to the blood inlet tube. There where the membrane changes from its radial direction to a tangential direction relative to the core it is pleated to accomodate for the great difference in circumference between the membrane and the connecting plug. This leads to a non-reproducible strong restriction of the passage in the membrane. This restriction causes a high resistance to the flow of the blood stream in the artificial kidney, which resistance will vary greatly from dialyzer to dialyzer. For a particular flow rate of the blood a higher flow resistance will make it necessary then for the blood to be fed at a higher pressure. This higher blood pressure leads to an increase in thickness of the film of blood in the dialysis membrane and, consequently, to a longer diffusion path for the impurities which are to be removed and a decrease of the effect of the dialysis.

With the artificial kidney according to German Pat. Application No. 2,116,517, use is made of a rectangular connecting plug for the connection of the dialysis membrane to the blood tube. The circumferential dimension of this plug, relative to the width of the flat dialysis membrane, is greater than in the case of a connection with a round connecting plug. Consequently, the dialysis membrane is pleated less. Nevertheless, with this known embodiment the difference between the circumferential dimensions of the dialysis membrane and that of the connecting plug is still considerable, so that also with this embodiment the formation of pleats must be taken into account.

It is therefore an object of this invention to provide a blood dialyzer of the type described which is devoid of the foregoing disadvantages. Another object of the invention is to provide a blood dialyzer having a hollow, rigid, cylindrical core and a dialysis membrane wrapped thereabout with an improved means for attaching the dialysis membrane to the blood inlet tube.

Other objects will become apparent from the following description with reference to the accompanying drawing wherein FIG. 1 is a view, partly in section, of a blood dialyzer provided by the invention;

Figure 1:
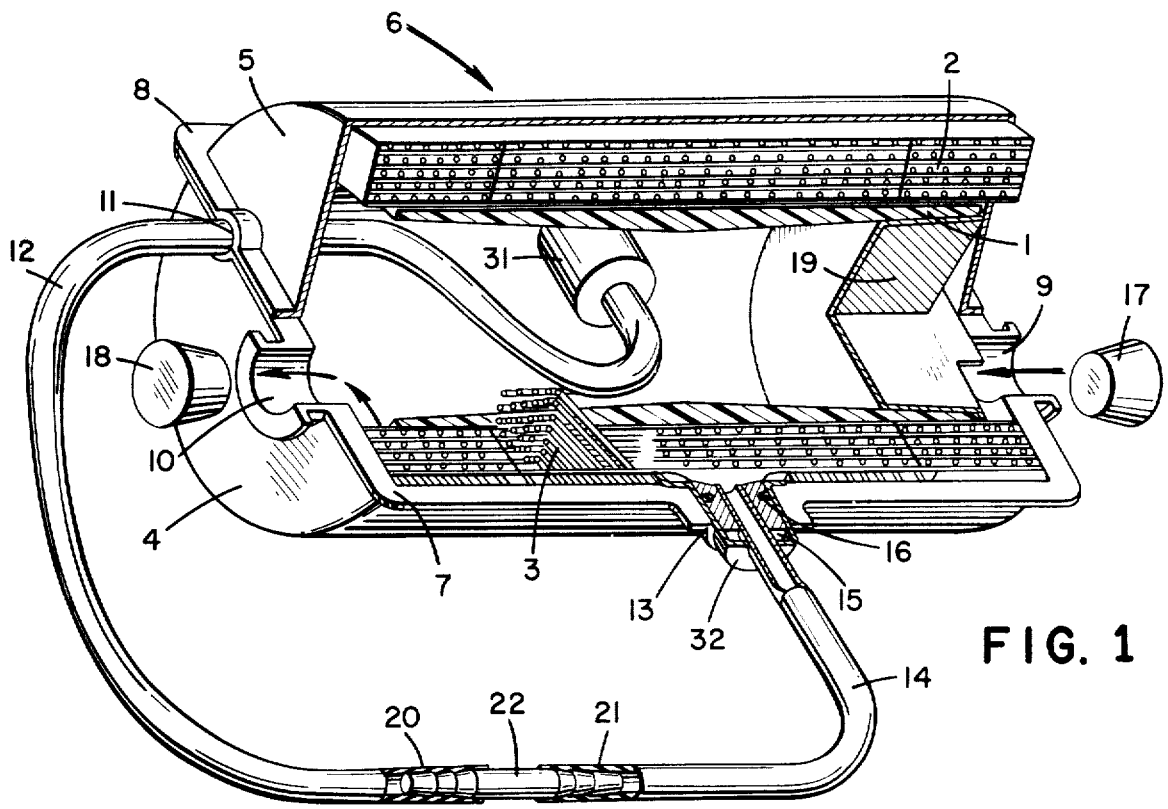

The foregoing objects and others are accomplished in accordance with this invention, generally speaking, by providing a blood dialyzer having a core having a rigid cylindrical wall, an opening in the core wall, a dialysis membrane about the core and attached to a blood tube at the opening, and a recess or groove in the outer wall of the core adjacent to the opening and adapted to receive the pleated membrane. The recess in the core wall provides for more freedom of movement at the point where the thickness of the membrane is increased by pleats. As a result there is a significantly lower resistance to the flow of blood between blood carrying tubes and the dialysis membrane.

It will be clear that if the core is provided with several openings at which there is the critical transition from a radial to a tangential direction relative to the core, a recess may be provided near each opening. This may be the case if one core is to support several dialysis membranes.

It should be pointed out that a core for an artificial kidney provided with recesses is known per se from an article of Kolff and Watschinger, entitled "Further development of a coil kidney," J. Lab. Clin. Med. 47 (1956) pp. 969-977 and from U.S. Pat. No. 3,650,404 (Versaci). However, in contrast to the device according to the invention, the cores of both known artificial kidneys have to accomodate the connections of the dialysis membrane to the blood tubes since these connections are inside the dialysis space. No special provisions are disclosed to meet the disadvantageous formation of pleats in the dialysis membrane near the connections. With the artificial kidney according to Kolff and Watschinger the core is too thin to accomodate the connections in the core openings; and with the artificial kidney according to Versaci its core is not hollow but solid.

A further embodiment of the blood dialyzer according to the invention is characterized in that the depth of the recess, measured in radial direction of the core, is not more than forty times the thickness of the dialysis membrane in wet condition. A preferred embodiment of the blood dialyzer according to the invention is characterized in that the recess extends as far as the core opening and that the width of the recess measured in axial direction of the core decreases towards said core opening. In this way the shape of the recess is adapted to the change in form of the dialysis membrane from the maximum width to the width at the point of the first connection. It is preferred that the converging edges of the recess run near the sides of the narrowing dialysis membrane. As a result, the part of the supporting gauze adjacent to this narrowing part of the membrane covers the largest possible surface area of the core; in this way it is not possible for this part of the membrane to narrow any further.

A very suitable variant embodiment according to the invention is characterized in that there is provided a strip extending over the core passage and lying between the first convolution of the dialysis membrane and the first convolution of the supporting screen. The strip prevents the dialyzer coil from being two strongly impressed at the core opening, which could lead to damage of the dialysis membrane.

A preferred embodiment is characterized in that the strip is connected at one edge to the surface of the core and that its opposite free edge extends to beyond the core opening and over the recess in the core. The application of the strip is especially useful in combination with the recess in the core, the latter preventing the strip from blocking the blood passage in the dialysis membrane. Preferably the strip is made of a thin, semi-stiff plastic material.

The end of the supporting gauze resting on the core may lie in the recess if the latter is sufficiently deep. It is preferred, however, that the end of the supporting gauze resting on the core is attached to the core surface near the wide mouth of the recess. The gauze may very suitably be attached there by means of adhesive tape, which also provides some prorection from damage of the membrane by projecting ends of the gauze. The blood dialyzer may with further advantage be so formed that at least the part of the recess located between the core opening and the end of the supporting gauze resting on the core is provided with ripples. The resulting ripple pattern then replace the supporting gauze in the recess.

A further embodiment of the blood dialyzer according to the invention is characterized by a rigid-walled housing which tightly surrounds the dialysis membrane would on the core. This housing promotes the favorable influence of the core recess on the effect of the dialysis in that it counteracts undesirable expansion of the blood path.

A variant of the embodiment with the rigid-walled housing is characterized according to the invention in that the rigid-walled housing is provided with an opening supporting the second connection, which comprises a hollow plug on which the outside open end of the dialysis membrane is secured liquid-tight by attaching means and in that near the opening the inside of the housing is provided with a recess for receiving the part of the membrane positioned near the second connection.

The resulting additional advantage of the construction comprising a rigid-walled housing consists in that it is possible to provide a recess also for the second blood tube.

The housing may, of course, be provided with several recesses if it has more than one opening, which may be the case if the core supports several coiled dialysis membranes connected in parallel.

Referring now to the drawing, the blood dialyzer shown in FIG. 1 is composed of a hollow plastic core 1 around which there is provided a dialysis space accomodating a dialysis membrane and a supporting gauze, which are both wound on the plastic core.

The membrane tube 2 is made of Cuprophan and serves as dialysis membrane. The gauze 3 is extruded polypropylene netting of a generally known structure.

The whole is enclosed in a housing 6 of an impact-resistant plastic material, e.g., polystyrene having two semicylindrical parts 4 and 5. The two parts 4 and 5 are provided with flanges 7 and 8, which are attached to each other for instance by gluing or ultrasonic welding. The housing 6 is provided with an inlet 9 and an outlet 10 for the dialysis fluid, which are closed by the plugs 17 and 18, respectively, and with a passage 11 for a first blood tube 12 and a passage 13 for a second blood tube 14. The blood tubes 12 and 14 may be polyvinyl chloride and are connected to the ends of the membrane tube 2. In order that the blood tube 12 may be connected to the membrane tube 2, the core 1 is provided with an opening in which a sleeve 31 fits. The connection of the blood tube 12 to the membrane tube 2 is the same as that for the blood tube 14. This latter tube has at its end an annular plug 15 on which the one end of the membrane tube 2 is placed. The membrane tube 2 is secured on the plug 15 with the aid of a rubber ring 16 or with a cord wound on tube 2. On the plug 15 is a sleeve 32 which is mounted in the wall of the housing 6. Alternatively, the sleeve may be formed integral with the housing. The free ends 20 and 21 of the blood tubes 12 and 14, respectively, are interconnected by means of a hollow coupling member 22.

Near the inlet 9 there is a partition 19 which separates the core 1 from the dialysate compartment.

The membrane tube 2 divides the inside of the housing 6 into a blood compartment within the tube 2 and a dialysate compartment outside tube 2. The blood compartment communicates with the continuous channel formed by the interconnecting blood tubes 12 and 14. When the dialyzer is used as an artificial kdiney, the blood tubes 12 and 14 are connected to respectively an artery and a vein of a person to be dialyzed, as a result of which blood will flow through the membrane tube. To the dialysate compartment dialysis fluid is fed through the inlet 9. The partition 19 forces the dialysis fluid to flow between the core 1 and the housing 6, in which it will flow between the coils of the membrane tube 2. Low-molecular weight waste materials such as urea and creatinine contained in the blood will filter through the membrane, after which they are discharged along with the dialysis fluid.

After the dialysis, the dialyzer along with the blood tubes 12 and 14 can be thrown away.

Figure 2:
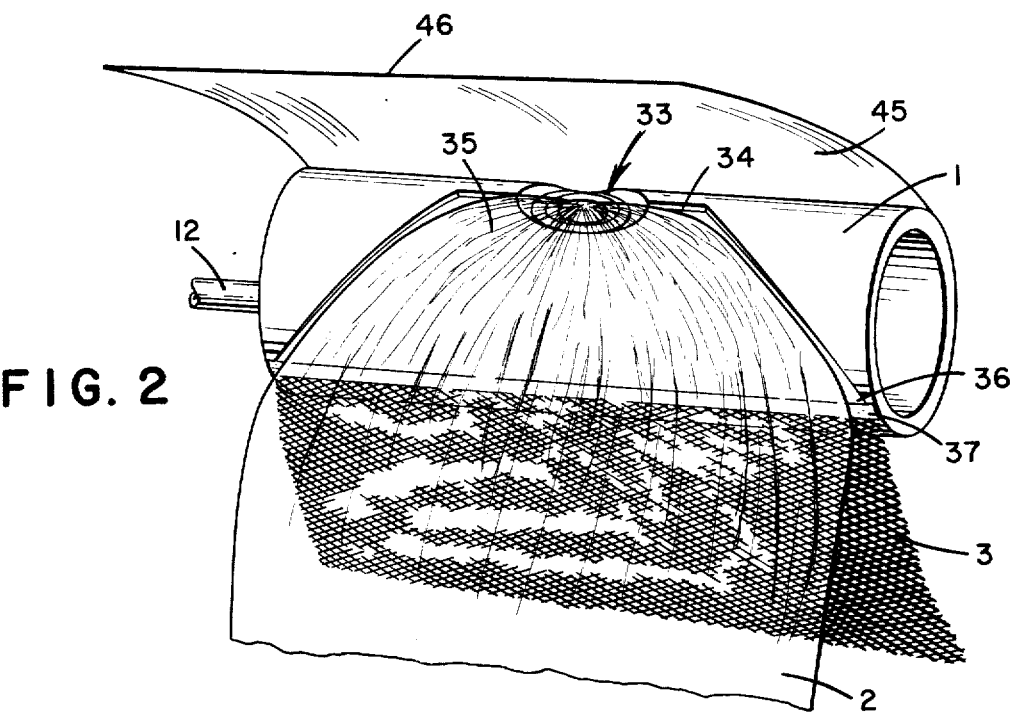
FIG. 2 illustrates the core used in the blood dialyzer of FIG. 1.

FIG. 2 shows the core 1 with part of the membrane tube 2 and the supporting gauze 3. The core 1 is provided with a recess or groove 34, which narrows towards the opening 33. In this recess, which has a depth of a few tenths of a millimeter, is the inside end 35 of the membrane tube 2. As illustrated in the drawing, groove 34 extends partially around the periphery of core tube 1 and is wider at the end spaced from opening 33 than it is adjacent to opening 33. End 35 is connected to the blood tube 12. At the wider side 36 of the recess 34, the supporting gauze 3 is attached to the core 1 by means of adhesive tape 37. The gauze preferably rests at one end in an axially directed recess in the core so as to avoid an abrupt change in the coil diameter of the dialysis membrane.

A semi-stiff, relatively thin plastic strip 45 is secured by one of its edges to the core 1, e.g., by gluing or ultrasonic welding. With the dialysis membrane 2 and supporting gauze 3 coiled on the core 1, the opposite edge 46 of the strip 45 completely covers the core opening 33 and the recess 34. The strip 45 thereby prevents undue deformation of the dialysis membrane 2 at the core opening 33 where the membrane 2 and the gauze 3 would otherwise remain unsupported.

Because of recess 34 the strong formation of pleats in the membrane 2, which is due to the great difference in circumference between the membrane and the connecting plug, does not lead to a great resistance to the blood flow. The resulting lower blood resistance has the further advantage that the filtration is adjustable between wider limits.

Figure 3:
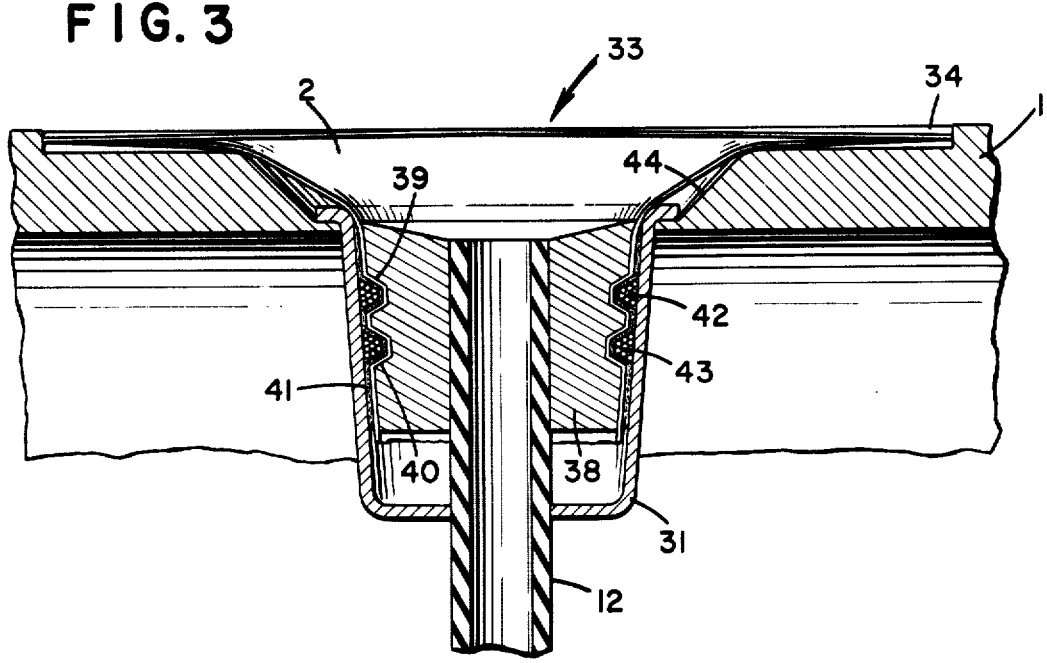
FIG. 3 illustrates the connection of a blood tube to the membrane used in the blood dialyzer.

The connection of the membrane tube 2 to the blood tube 12 is illustrated in FIG. 3. The end of the membrane tube 2 is pleated on the connecting plug 38, which is provided with two annular grooves 39 and 40. On the membrane tube there is placed a medical plaster 41 of polyvinyl chloride known under the trade name Leukoflex, the adhesive side being on the membrane tube and the smooth side facing outwards. The connection is secured by means of two knitted cords 42 and 43 in the grooves 39 and 40. On it is provided a flexible polyethylene sleeve 31 whose edge rests in the opening 44 of the core 1. The use of a smooth tape between the cords 42 and 43 and the membrane tube 2 plays an important role in the sealing of the connection of the membrane tube 2 on the blood tube 12. Without the use of such a tape there is an increased chance of leakage. The chance of leakage decreases if use is made of a tape or Cuprophan, i.e., the material of which the membrane tube 2 is made. A further decrease is obtained if use is made of a polyethylene tape. Even more favorable results are obtained, however, if use is made of the abovementioned medical plaster.

On the other hand, if the connecting plug 38 is sufficiently elastic at its outer circumference, then there is no need to provide a tape between the cords 42 and 43 and the membrane tube 2. In that case the sealing will be even better than when use is made of the aforementioned medical plaster.

This result may be achieved by using a connection plug of a stiff, non-elastic material on the circumferential surface of which plug an elastic layer is provided, preferably having a thickness of a few tenths of a millimeter.

Moreover, the use of a knitted piece of cord has been found to lead to a lower percentage waste as a result of leakage than when use is made of a non-knitted cord of the same material. It will be clear that the connection discussed with reference to FIG. 3 may with advantage be applied to all artificial kidneys comprising a coiled dialysis membrane, irrespective of their specific build-up.

EXAMPLE

Figure 4:
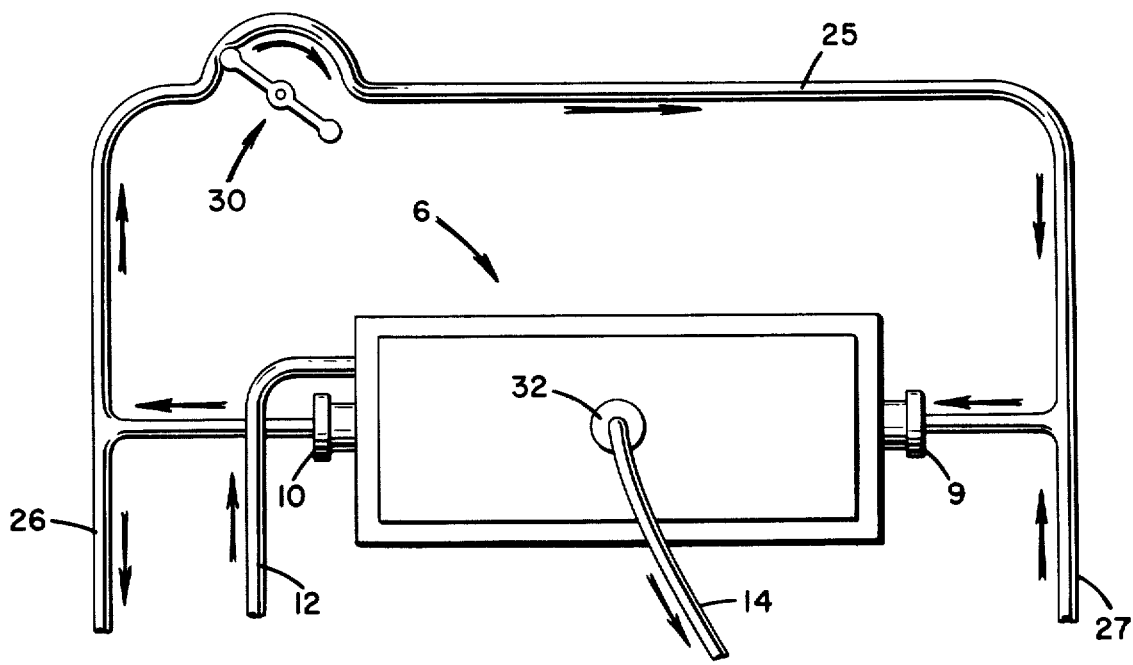
FIG. 4 illustrates a test set-up with a blood dialyzer provided by the invention.

With the blood dialyzer described a number of experiments were carried out in Vitro, use being made of a set up as schematically shown in FIG. 4. The inlet 9 and the outlet 10 of the dialyzer were interconnected by a dialysate tube 25 which is suitable for use in a tubing pump 30. The dialysate tube was provided with two terminal sections 26 and 27. The dialysate compartment together with the dialysate tube 25 formed a recirculation circuit for the dialysate fluid. The dialysis fluid was partly renewed by feeding fresh dialysis fluid to the circuit through the tubular section 27 and withdrawing an equal amount of circulated fluid from the circuit through the tubular section 26.

The membrane tube 2 has a width of 15 cm, so that the total circumference measured 30 cm. The length of the membrane tube 2 was 290 cm, its total thickness about $2 \times 25 = 50$ μm. A urea solution of 37°C. was passed through the membrane tube 2 at a rate of flow of 200 ml/min. and discharged through a tube 14. The solution was prepared by dissolving urea in demineralized water in a concentration of 600 mg of urea per liter of solution. The pressure at the outlet end of the artificial kidney was maintained at 70 mm Hg. Fresh dialysis fluid was delivered into the dialysate tube 27 at a rate of 500 ml/min. At the same rate dialysis fluid was withdrawn from the recirculation circuit through the dialysate tube 26. Demineralized water was used as the dialysis fluid. The pressure of the dialysis fluid was kept below 20 mm Hg. The tubing pump 30 was successively set to flow rates of 3000 ml/min., 1500 ml/min., and 0 ml/min. In the last measurement, the tubing pump 30 was not in operation, so that only fresh dialysis fluid was fed at a rate of 500 ml/min. to the artificial kidney.

TABLE I

| | Flow rate through tubing pump 30 (ml/min) | $C_{B1}$ mg/l | $C_{B2}$ mg/l | η |
|---|---|---|---|---|
| 1 | 3000 | 600 | 306 | 0.49 |
| 2 | 1500 | 600 | 306 | 0.49 |
| 3 | 0 | 600 | 330 | 0.45 |

$C_{B1}$ and $C_{B2}$ refer to the urea concentrations in, respectively, the stream entering and leaving the membrane tube. The efficiency is defined by $$\eta = \frac{C_{B1} - C_{B2}}{C_{B1}}$$

These measurements not only show that a high efficiency is obtained, but also that the efficiency decreases very little if there is no recirculation.

This relatively small decrease in efficiency can be compensated for, if desired, by using a somewhat longer or wider membrane tube.

The favorable results obtained might be due to the use of the relatively wide membrane tube inside the rigid-walled housing 6. For a given dialyzing surface an increase in width of the membrane tube may permit a reduction of its length. The dialysate will thereby be given a passage having a smaller cross-sectional area so that at a given volumetric flow rate of the dialysate the linear flow rate of the dialysate in the artificial kidney will be higher. The rigid walls of the housing prevent said passage from expanding during operation.

For the same dialyzing surface, an even smaller dialysate passage may be obtained by using several membrane tubes connected in parallel and wound side by side on the core.

Subsequently, a number of resistance measurements were carried out on the blood path. The conditions were the same as in the preceding experiment, ecept that instead of urea solution an NaCl solution was passed through the membrane tube, no use being made of the tubing pump 30 so that no recirculation took place. Consequently, only fresh dialysis fluid (demineralized water) was fed to the artificial kidney. The volumetric flow rate of the dialysis fluid was varied.

The results of this experiment are shown in Table II. Column 2 contains the blood resistance values obtained when using a normal connection, with the blood flowing from the inside coil of the membrane to its outside coil. Column 3 gives the blood resistance values obtained when using a reversed connection, with the blood entering the artificial kidney through the blood tube 14 and leaving it through the blood tube 12. The blood resistance is defined as the difference between the pressure of the entering blood and the leaving blood, expressed in mm mercury pressure.

TABLE II

| | Flow rate of the dialysate in the artificial kidney (ml/min) | Blood resistance (mm Hg) | |
|---|---|---|---|
| | | normal connections | reversed connections |
| 1 | 1000 | 64 | 112 |
| 2 | 500 | 89 | 108 |
| 3 | 250 | 85 | 105 |
| 4 | 125 | 90 | 102 |

These results show that the blood resistance is low and, moreover, that on the whole the use of reversed connections does not cause it to considerably increase.

Although the invention has been described in detail for the purpose of illustration, it is to be understood that such detail is solely for that purpose and that variations can be made therein by those skilled in the art without department from the spirit and scope of the invention except as it may be limited by the claims.

What is claimed is:

1. A blood dialyzer having a substantially cylindrical housing, a substantially cylindrical hollow core member disposed in said housing and having its wall spaced inwardly therefrom to provide an annular dialysis space therebetween, a dialyzer membrane and supporting gauze wound about the core member in the annular space, means for the introduction of dialyzer fluid into the dialysis space and means for flow of dialyzer fluid from the dialysis space, the wall of said core member having an opening therein, means for introducing blood through the opening into the said membrane comprising a blood tube, a plug about the tube and in said opening, one end of said dialyzer membrane being pleated to reduce its cross-section to correspond substantially to the cross-section of the opening and disposed about the said plug in a substantially liquid impervious relationship, said wall having a recess which extends circumferentially from adjacent to the said opening only partially around the core member, said recess diverging from said opening towards the ends of the core member, said pleated membrane being disposed in said recess, and means for removing the blood after dialysis from the dialyzer.

2. The blood dialyzer of claim 1 wherein the depth of the recess measured in the radial direction of the core is not more than forty times the thickness of the dialysis membrane in wet condition.

3. The blood dialyzer of claim 1 wherein the recess extends as far as the core opening and the width of the recess in the axial direction of the core gradually decreases towards the core opening.

4. The blood dialyzer of claim 1 wherein a strip extends over the core passage and between the first convolution of the dialysis membrane and the first convolution of the supporting screen.

5. The blood dialyzer of claim 4 wherein the strip is connected at one edge to the surface of the core and the opposite free edge thereof extends to beyond the core opening and over the recess in the core.

6. The blood dialyzer of claim 4 wherein the strip is a thin, semi-stiff plastic material.

7. The blood dialyzer of claim 1 wherein the end of the supporting gauze resting on the core is attached to the core surface near the wide mouth of the recess.

8. The blood dialyzer of claim 7 wherein at least the part of the recess located between the core opening and the end of the supporting gauze resting on the core is provided with ripples.

9. The blood dialyzer of claim 1 wherein a rigid-walled housing tightly surrounds the dialysis membrane wound on the core.

10. The blood dialyzer of claim 9 wherein the rigid-walled housing is provided with an opening supporting the second connection, said second connection comprises a hollow plug on which the outside open end of the dialysis membrane is secured liquid-tight, and a recess for receiving the part of the membrane near said second connection on the inside of the housing.

11. The blood dialyzer of claim 1 wherein the means for introducing blood into the dialysis membrane and means for removing blood therefrom are two blood tubes, each communicating with one end of the dialysis membrane by way of a connection which comprises a hollow plug connected to a blood tube and means for attaching an open end of the dialysis membrane liquid-tight on said plug, and a tape having a smooth side facing the attaching means and its opposite side facing the dialysis membrane.

12. The blood dialyzer of claim 11 wherein said tape is an adhesive which is smooth on one side.

13. The blood dialyzer of claim 1 wherein the means for introducing blood into the dialysis membrane and means for removing blood therefrom are two blood tubes each communicating with one end of the dialysis membrane by way of a connection which comprises a hollow plug connected to a blood tube and means for attaching one open end of the dialysis membrane liquid-tight on said plug, said hollow plug having a core of stiff material supporting a sheath of plastic material.

14. The blood dialyzer of claim 1 wherein the attaching means are formed by a knitted piece of core.

15. The dialyzer of claim 1 wherein a medical plaster having an adhesive side and a non-adhesive side is disposed between the membrane and plug with the adhesive side next to the plug.

* * * * *